April 8, 1952  E. L. SINCLAIR ET AL  2,592,479
CATALYTIC CONTACTING TOWER
Filed Feb. 12, 1946  2 SHEETS—SHEET 1
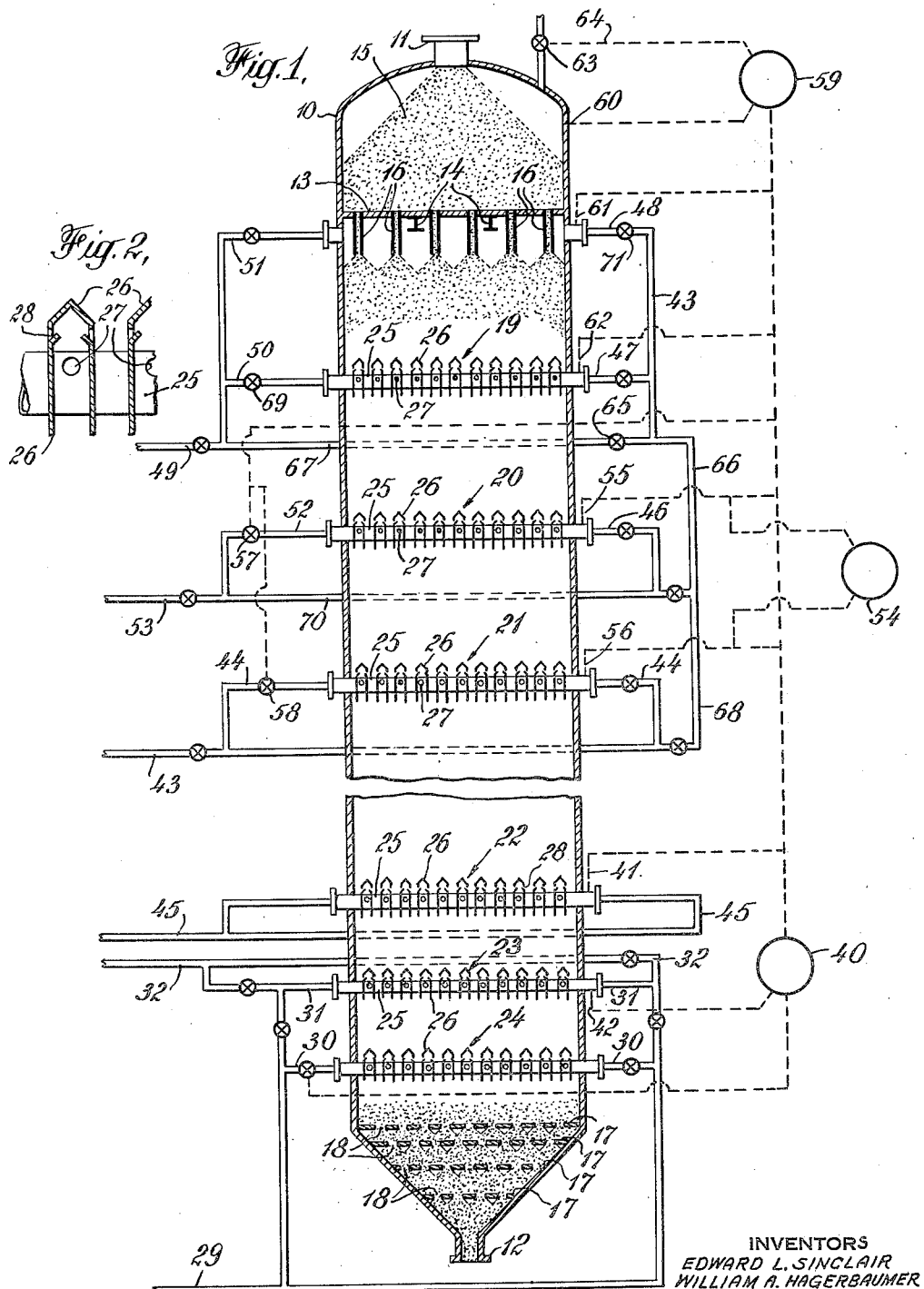
INVENTORS
EDWARD L. SINCLAIR
WILLIAM A. HAGERBAUMER
BY
John A. Crowley, Jr.
AGENT OR ATTORNEY

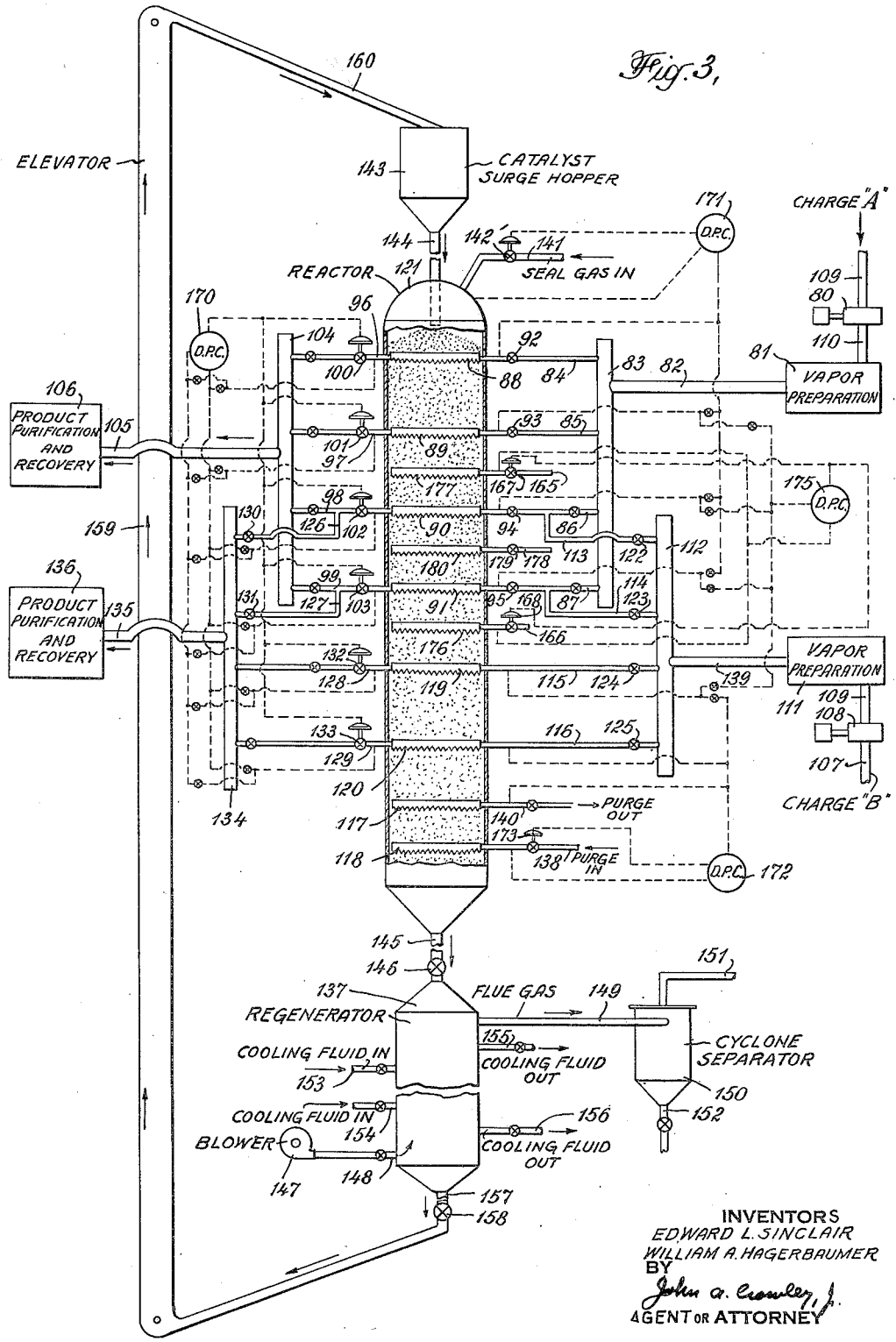

Patented Apr. 8, 1952

2,592,479

UNITED STATES PATENT OFFICE 2,592,479

CATALYTIC CONTACTING TOWER

Edward L. Sinclair, Manhasset, N. Y., and William A. Hagerbaumer, Westfield, N. J., assignors to Socony-Vacuum Oil Company, Incorporated, a corporation of New York Application February 12, 1946, Serial No. 647,176

7 Claims. (Cl. 23—288)

This application is a continuation-in-part of application Serial Number 488,780, filed in the United States Patent Office May 27, 1943, now Patent No. 2,418,672.

This invention has to do with methods and apparatus for the conversion of hydrocarbons in the presence of a particle-form catalytic contact mass.

As is well known, when a hydrocarbon fraction, such as a gas oil, boiling substantially between about 500° F. and 750° F., in vapor form, at temperatures of the order of about 800° F. and above, usually about 850–875° F., is brought into contact with the particle form solid contact mass of the nature of fuller's earth or related clay-like materials, a substantial conversion to gasoline occurs. This operation is typical of the operations with which this invention is concerned, and will be used herein in an exemplary manner. It is to be understood, however, that this invention is not limited thereto, but is applicable to any reaction of hydrocarbon conversion, or of treating, or to any other reaction which may be carried out in a like manner.

More recently, such reactions have been carried out in a set-up wherein the particle form solid contact mass is moved in a flowing stream cyclically through two zones, in one of which the desired reaction occurs, and in the other of which the spent contact mass material from the first zone is regenerated prior to its return to the first, or reaction zone. This invention is concerned with the reactor zone of such operations.

In such reaction, two of the variables having to do with the results to be accomplished are rate of flow of reactant through the contact mass, and amount of exposure of reactants to contact mass. It frequently becomes desirable to effect changes in some of these variables for specific purposes, and it is a major object of this invention to provide a method of handling such reactions and a reaction apparatus in which a high degree of flexibility is provided in the relative amounts of hydrocarbon and of contact mass in contact in the reaction zone. The objects of this invention may be more readily understood by reference to the drawings attached hereto of which Figure 1 is a vertical view, partially in section, of a typical reactor and manifolding arrangement according to this invention; Figure 2 is a cross-sectional view of one of the elements shown in Figure 1; and Figure 3 is a typical essentially complete assembly of the embodiment of this invention. All of these drawings are highly diagrammatic in form.

Turning to Figure 1, 10 is a vertical reactor to which a particle form solid contact mass material is fed through pipe 11 and from which that material is removed through pipe 12. A short distance below the top of this reactor, there is a partition 13, supported by beams 14, thus defining a space 15 which acts as a preliminary storage and distributing zone for this contact mass material which flows downwardly into the reactor through a series of pipes 16 which are spaced appropriately and uniformly over the area of plate 13. Below this level, a contact mass material flows downwardly through the reactor, its rate of flow being subject to external control. Near the bottom of the reactor, there are a series of plates 17, each equipped with orifices 18 which are to insure uniform downward motion of the contact mass material throughout all portions of the cross section of the reactor 10 by first withdrawing the contact mass therefrom through a plurality of uniformly distributed orifices in upper plate 17 and then successively, since each plate in descending order has a lesser number of orifices, combining this multitude of streams into a single discharge stream. Within the reactor, spaced at several different vertical levels, there are a series of reactant distribution and collection grids, 19, 20, 21, 22, 23 and 24, the construction of all of which is generally similar and may be understood by referring to the uppermost grid 19, a portion of which is shown in magnified form in Figure 2. Reading Figure 2 for the moment together with Figure 1, we find that the grid is constructed of a transverse duct 25 extending from wall to wall within the reactor and terminating external to the reactor upon either side. Mounted transversely to this duct 25, are a series of inverted troughs 26, likewise extending from wall to wall within the reactor but in a direction transverse to that of duct 25. Each of these troughs has the form of an open bottomed gable roofed channel as may be seen more clearly in Figure 2. In the transverse duct 25, below each trough 26, there is an orifice 27. The trough 26 may, if desired, be equipped with one or more slots or louvers 28. This grid structure may be utilized either for distributing fluid reactants within the contact mass in the reactor or for collecting fluid reactants from within the contact mass, and removing them from the reactor. When utilized as an inlet distributor, the reactant will be introduced through the transverse duct 25, flow out through orifice 27, into the space under troughs 26 and then flow out into the contact mass, either through the open bottom or through such slots 28 as may be provided. It will be noted that this achieves a uniform distribution of reactant across the cross section of the reactor. When used as a collector grid, the flow of reactant products is reverse to the flow of reactant described above and thus an equally good uniform withdrawal of reaction products from all portions of the reactor is accomplished. The solid contact mass material flows downwardly between and around the troughs 26. Other forms of grid with similar performance may be used.

At the bottom of the reactor, the two grids 23 and 24 are used for the purpose of purging the contact mass of volatile reaction products and reactants before it leaves the reaction zone. To do this, steam or another suitable inert gas is introduced through pipe 29 and passes through pipes 30, 30 into grid 24 and thence upwardly through the contact mass material to be collected by grid 23 and removed through pipes 31, 31 and pipe 32. In order to prevent any undesirable passage of reactant materials into the purging zone, there is provided a differential pressure control instrument 40, which instrument observes the pressure in the adjacent reaction zone at point 41 and the pressure in the purging zone at 42 and so controls the valves in line 30 as to maintain either a substantial equivalency of pressure in those zones or any desired excess of pressure in the purging zone. In accordance with our previously mentioned application Serial No. 488,780 there is provided in the reactor a means whereby any portion of the contact mass therein may be utilized for reaction and this provision is so made that the contact of the reactant and of the contact mass may be either concurrent, that is, with reactants and contact mass flowing through the reactor in the same direction, or countercurrently. In this drawing, assuming that concurrent flow is desired, the reactant vapors will be introduced by pipe 43. In case it is desired to use only the bottom portion of the height of the reactor, those reactant vapors will be introduced through pipes 44 into grid 21 to flow downwardly through the contact mass and to be removed through grid 22 and pipe 45. In case a greater portion of the contact mass in the reactor is desired to be used, the reactant vapors may be introduced at higher levels as to grid 20 through pipe 46, to grid 19 through pipe 47, or through pipe 48 to the open space at the top of the reactor surrounding pipes 16 which space may be utilized for similar uniform introduction of reactant to or removal of reactant from the contact mass. It will be obvious by reversing the functions of pipes 43 and 45 and the appropriate grids, that countercurrent flow through any desired height of contact mass material may be accomplished.

So far, the apparatus and the methods by which it may be used, are only the equivalent of that disclosed in our previously mentioned application Serial No. 488,780. It will be observed that in case only a portion of the height of the reactor is used, there remains a very considerable volume of reactor content of contact mass which is not being utilized. It so happens that there are many other similar reactions for which it may be utilized without seriously impairing the ability of the contact mass to carry out the main reaction. For example, it is frequently desirable for various purposes, to re-treat or re-form or re-crack the gasoline-like products of a first catalytic cracking reaction, and in many cases this retreatment does not so degrade the catalyst as to render it inactive for the principal purpose of cracking. Various other combinations of operations exist which may be so used, and it is a major purpose of this invention to provide methods and apparatus whereby a single stream of contact mass material in a single reactor may be consecutively utilized for the accomplishment of two or more separate conversions of hydrocarbons without substantial admixture of reactants and reaction products other than coke arising from the separate reactions. To this end the unutilized portion of the reactor may be used as follows.

Assuming that one reaction is being conducted in the lower part by introducing reactants through 21, and removing them through 22. Another reaction may be conducted in any portion of the remaining height of the reactor as follows. Secondary reactants may be introduced through pipe 49 and may be led into the reactor through grid 19 and pipes 47 or 50 or into the space at the top surrounding pipes 16 through pipes 48 or 51, to flow downwardly through the reactor and be removed therefrom by pipes 46 or 52, products of reaction to be removed from the system through pipe 53. Also, by closing valve 65 in pipe 67, valve 71 in pipe 48, and valve 69 in pipe 50, reactants may be introduced through pipe 49 and led into the reactor through pipe 51 to the space surrounding pipes 16. Reaction products may be withdrawn from grid 19 through pipe 47 from which it flows via manifold pipes 43, 66, and 70 to outlet pipe 53. It will be obvious that countercurrent flow of reactants and catalyst may be effected by reversing the functions of pipes 49, 53 and 43 and appropriate grids. It will also be understood that more inlet and outlet grids may be provided than those shown in the drawing and that by proper arrangement of manifolds and valves, a most complete utilization of the column of contact mass can be made in this manner.

An important consideration is the prevention of substantial admixture of the materials being treated and the products originating in each reaction zone. To this end there is installed a second differential pressure control 54 which control instrument observes the pressure in the upper reaction zone at point 55 and the pressure in the lower reaction zone at point 56 and by proper connection to a valve controlling either of said reaction zones, or, if desirable, to valves controlling both of said reaction zones such as valves 57 and 58 maintains a substantial equilibrium of pressure between the adjacent points of the two zones to prevent flow of materials other than contact mass and the coke it carries from one into another. It is true that there will be some amount of such materials adsorbed upon the flowing contact mass material, but it has been found that this amount is not sufficiently great to impair the operation when properly related reactions are being carried on in adjacent zones. A single further control is utilized consisting of a differential pressure control instrument 59 which observes first at point 60 the pressure within contact mass storage space 15 and through appropriate connections as at 61, 62, 55, 56, the pressure at the uppermost level which is being used for reaction. If, for example, only the main reaction is being carried out and the upper portion of the reaction is entirely unutilized for a secondary reaction, it will observe the pressure at point 56. If, for example, a main reaction is carried out in the zone between grids 21 and 22 and the secondary reaction is being carried out in the zone between grids 19 and 20, then the other point of reaction, namely, that uppermost point of the reactor at which the reaction is being carried out will be point 62. Observing these two pressures, the differential pressure control instrument 59 then so controls valve 63 in pipe 64, which pipe 64 is connected to a source of inert gaseous material such as flue gas, as to provide within the portions of the reactor above the uppermost reaction level an atmosphere of flue gas at sufficient pressure to prevent reactant materials from flowing or diffusing substantially into the unused portion of the contact mass in the reactor. It will be understood that in connection with both differential pressure control 54 and differential pressure control 59, only a portion of the manifolding is shown and that in an operating apparatus, proper provisions would be provided so that the controls effected by either of these instruments could be applied at any appropriate levels within the reactor.

With the arrangement and method here shown, it will be realized that it is possible to flow a stream of particle form solid contact mass material continuously through a reactor zone, to utilize one portion of the contact mass material in that reactor for a selected reaction, to utilize any other portion of the contact mass in that reactor for another reaction, to prevent substantially the admixture of reactants and reaction products of the two or more reactions, and to prevent unwanted diffusion of reactants into unused portions of the contact mass material within the reactor.

Turning now to Figure 3, we show in highly diagrammatic form an essentially complete exemplary set-up of a typical arrangement of the embodiment of our invention when used for catalytic conversion of two hydrocarbon charge stocks. Charge stock A, which may be a relatively light gas oil or naphtha cut, is pumped from pipe 109 by pump 80 through pipe 110 to vapor preparation unit 81 which may consist essentially of a heater, such as a pipe still or other appropriate commonly-used type of heater. The charge stock is essentially vaporized and heated to the desired reaction temperature and then passes through feed conduit 82 to vertical manifold 83. To vertical manifold 83 are connected pipes or rows of pipes 84, 85, 86 and 87 which are connected through the reactor shell 121 with vapor-handling members 88, 89, 90 and 91 respectively. Valves 92, 93, 94 and 95 are located on pipes 84, 85, 86 and 87 respectively to permit selective introduction of reactant vapors from manifold 83 into any one of the vapor-handling members 88, 89, 90 and 91. Vapor outlet pipes 96, 97, 98 and 99 carrying valves 100, 101, 102 and 103 respectively are connected to the opposite ends of vapor-handling members 88, 89, 90 and 91 respectively to permit selective withdrawal of reactant products from any one of these vapor-handling members to the common vertical vapor outlet manifold 104, which in turn connects through conduit 105 to the product purification and recovery system 106. System 106 may consist of the usual apparatus well-known to the art. From the above, it will be apparent that any two of the vapor-handling means 88, 89, 90 and 91 may be used, either one as inlet and the other as outlet for reactant A so as to permit passage of reactant A upwardly or downwardly through any desired length of that portion of the reactor 121 between the two handling members chosen as inlet and outlet. For example, by closing valves 93, 94 and 95 and valves 100, 101 and 102, reactant charge A may be passed through pipe 84 and open valve 92 into vapor-handling member 88 from which it passes downwardly through the catalyst in reactor 121 until the vapor products are collected by handling member 91. The vapor products then pass through pipe 99 and open valve 103 into outlet manifold 104 and thence through conduit 105 to the product purification system 106.

A second charge stock B, which may be a gas or fuel oil cut may be pumped from pipe 107 by pump 108 through pipe 109 to vapor preparation unit 111. The vapor then passes at the desired reaction temperature through conduit 136 to the second vertical feed manifold 112. Manifold 112 is connected through pipes 113, 114, 115 and 116 carrying valves 122, 123, 124 and 125 respectively to reactant vapor-handling members 90, 91, 119 and 120 respectively. Vapor-handling members 90, 91, 119 and 120 are connected on their opposite ends through pipes 98, 99, 128 and 129 respectively, carrying valves 102, 103, 132 and 133 respectively to the second vertical outlet manifold 134. Manifold 134 is in turn connected through conduit 135 to a second product purification and recovery system 136. Thus, it will be apparent that reactant B may be selectively introduced or withdrawn from any one of the reactant vapor-handling members in reactor 121 excepting the upper two while reactant A may be selectively introduced or withdrawn from any one of the reactant vapor-handling members except the lowermost two. Thus, for example, while reactant A enters at vapor-handling member 88 and leaves through member 91, reactant B may be caused to pass from vertical manifold 112 and pipe 116 into vapor-handling member 120 and leave through vapor-handling member 119, all by proper adjustment of the valves provided in the two manifolding systems. Also provided within the lower section of the reactor 121 are purge gas handling member 118 supplied with purge gas such as steam or flue gas through pipe 138, and purge gas collecting member 117 which is provided with outlet pipe 140. In the top of the reactor a seal gas inlet pipe 141 carrying valve 142 is provided.

The catalyst which is particle in form passes from a surge hopper 143 through an elongated feed leg 144 into the top of reactor 121 against the seal gas pressure maintained in the upper end thereof. The catalyst then passes downwardly through the reactor as a substantially compact column being withdrawn through conduit 145 which carries a catalyst flow control valve 146. By proper adjustment of valve 146, the reactor is maintained substantially filled with catalyst. The catalyst from the reactor carries a carbonaceous contaminant deposit which must be removed to maintain the catalytic activity so the catalyst passes through conduit 145 into a suitable regenerator 137 wherein the contaminant may be removed preferably by burning at elevated temperatures. The regenerator 137 may be any of a number of types known to the art but may be preferably one wherein the catalyst moves downwardly as a substantially compact column. Combustion supporting gas such as air may be introduced from blower 147 through conduit 148 into the lower section of the regenerator and flue gas may be withdrawn from the upper section of the regenerator through conduit 149.

The flue gas may carry small amounts of entrained catalyst which is separated by means of cyclone separator 150, the substantially catalyst-free gas discharging from the separator through pipe 151 and the catalyst through pipe 152. The separated catalyst may be, if of sufficient size, returned to the system or it may be utilized for other purposes. The catalyst temperature may be controlled during the regeneration by cooling by direct or indirect heat transfer with suitable cooling fluids introduced through pipes 153 and 154 and withdrawn through pipes 155 and 156. The regenerated catalyst is withdrawn through pipe 157 and flow control valve 158 thereon into a suitable conveyor such as a bucket elevator 159 by which it is conveyed upwardly to feed conduit 160 supplying the catalyst surge hopper.

A differential pressure controller 170 is provided to so control the reactant pressure in the two conversion sections as to minimize reactant flow into that unused section of the column between said conversion sections. For example, if reactant A is passed between handling means 88 and 89 and reactant B is passed between handling means 120 and 119, the pressure in these two sections is controlled by means of controller 170 activating diaphragm valves 101 and 132 on pipes 97 and 128, respectively, so as to minimize reactant flow between handling means 119 and 89. It will be noted that in this example handling means 89 and 119 are the two nearest adjacent fluid reactant handling means selected to handle different reactants. If reactant A were passed between handling means 89 and 90, then handling means 90 and 119 would be the two nearest adjacent reactant handling means. It is with this meaning that the term "two nearest adjacent fluid reactant handling means selected to handle different reactants" is employed in claiming this invention. It will be clear that this control of pressure may be accomplished regardless of between which handling means the two reactants flow and regardless of whether the flow is concurrent or countercurrent to the catalyst flow. Also differential pressure control instruments 171, 172 and 175 are provided to maintain an inert gaseous atmosphere at a pressure slightly greater than that in the conversion sections in all unused portions of the column. For example, when reactant A flows between handling means 88 and 90 and reactant B between handling means 120 and 119, an inert gas such as steam or flue gas may be admitted through diaphragm valves 142 and 173 on pipes 141 and 138 respectively at rates controlled by differential pressure control valves 171 and 172 respectively. The inert gas introduced through pipe 138 may be withdrawn either through outlet pipe 140 or it may be withdrawn along with reactant B from handling means 119. Also a differential pressure controller 175 is provided to control the rate of introduction of an inert gas to an intermediate section of the vessel between the two zones used for conversion. Thus in the above example inert gas may be introduced through pipe 166 and diaphragm valve 168 under gas distributing member 176 within the vessel. The pressure at the inlet pipe 166 may be greater than the pressure in either of the adjacent conversion zones. Similarly if the reactant A is passed between handling means 88 and 89 and reactant B is passed between handling means 120 and 90, inert gas may be introduced through pipe 165 and diaphragm valve 167 under the distributing member 177 at rates controlled by differential pressure controller 175. A similar inlet pipe 178 bearing valve 179 is provided to introduce inert gas under distributing member 180, when necessary. Diaphragm valve 179 may also be operated by differential pressure controller 175. The inert gas may be admitted to the intermediate unused portion of the column in conjunction with the reactant pressure control by differential pressure controller 170 or in some operations, inert gas may be admitted only to the unused end portions of the catalyst column, and the pressure control by instrument 170 may be alone relied upon to substantially prevent reactant flow in the intermediate unused portion of the column between the two reaction sections. In any case, where inert gas is introduced, its rate of introduction is so controlled by the appropriate differential pressure controller to maintain an inert gaseous pressure slightly greater than the gaseous pressure in the sections of the catalyst column devoted to reactant flow. The differential pressure may be maintained of the order of $\frac{1}{4}$ to $\frac{1}{2}$ pound per square inch, for example.

It will be understood that the specific details of design and the examples of operation application are intended as exemplary only and are in no way to be construed as limiting the scope of this invention except as it may be limited by the following claims.

We claim:

1. An apparatus for conducting two or more conversions of hydrocarbons in the presence of the same moving stream of particle form solid contact mass material comprising: an elongated reaction chamber of substantially constant cross section along its length, means to supply contact mass material to the upper end thereof and means to withdraw it from the lower end thereof, flow throttling means associated with said withdrawal means, at least four fluid reactant handling means in the form of inverted troughs within said chamber, all spaced apart along the length of said reaction chamber, said chamber having its cross-section unobstructed along its entire length between the uppermost and lowermost fluid handling means except for said fluid handling means, a first external reactant inlet manifold connected directly in communication with all but the two lowermost fluid reactant handling means, valve means associated with said first inlet manifold to permit exclusion of vapor flow between said manifold and any of the fluid handling means in vapor flow communication therewith, a first external reactant fluid outlet manifold connected directly in communication with all but the two lowermost fluid reactant handling means, valve means associated with said first outlet manifold to permit exclusion of vapor flow between said outlet manifold and any of the fluid handling means in vapor flow communication therewith, a second external fluid reactant inlet manifold connected directly in flow communication with all but the two uppermost reactant fluid handling means, valve means associated with said second fluid inlet manifold to permit exclusion of vapor flow between said second inlet manifold and any reactant handling means in vapor flow communication therewith, a second external fluid reactant outlet manifold connected directly in communication with all but the two uppermost reactant fluid handling means, valve means associated with said second fluid outlet manifold to permit exclusion of vapor flow between said second fluid outlet manifold and any reactant handling means in vapor flow communication therewith.

2. An apparatus for conducting two or more conversions of hydrocarbons in the presence of the same moving stream of particle form solid contact mass material comprising: an elongated reaction chamber of substantially constant cross section, means to supply contact mass material to the upper end thereof and means to withdraw it from the lower end thereof, flow throttling means associated with said withdrawal means, at least four fluid reactant handling means in the form of inverted troughs within said chamber, all spaced apart along the length of said reaction chamber, said chamber having its horizontal cross sectional area unobstructed along its entire length between the uppermost and lowermost fluid handling means except for said fluid handling means, a first external reactant inlet manifold, conduits connecting said manifold with all but the two lowermost fluid reactant handling means, valve means associated with said first inlet manifold to permit exclusion of vapor flow between said manifolding and any of the fluid handling means in vapor flow communication therewith, a first external reactant fluid outlet manifold, conduits connecting said manifold with all but the two lowermost fluid reactant handling means, valve means associated with said first outlet manifold to permit exclusion of vapor flow between said outlet manifold and any of the fluid handling means in vapor flow communication therewith, a second external fluid reactant inlet manifold, conduits connecting said manifold with all but the two uppermost reactant fluid handling means, valve means associated with said second fluid inlet manifold to permit exclusion of vapor flow between said second inlet manifold and any reactant handling means in vapor flow communication therewith, a second external fluid reactant outlet manifold, conduits connecting said manifold with all but the two uppermost reactant fluid handling means, valve means associated with said second fluid outlet manifold to permit exclusion of vapor flow between said second fluid outlet manifold and any reactant handling means in vapor flow communication therewith, means to introduce a first reactant fluid into the first of said fluid reactant inlet manifold, means to withdraw gaseous reaction products from said first reactant fluid outlet manifold, means to separately introduce a second reactant fluid into said second fluid inlet manifold and means to withdraw gaseous reaction products from said second fluid outlet manifold.

3. An apparatus for conducting two or more conversions of hydrocarbons in the presence of the same moving stream of particle form solid contact mass material comprising: an elongated reaction chamber of substantially constant cross section along its length, means to supply contact mass material to the upper end thereof and means to withdraw it from the lower end thereof, flow throttling means associated with said withdrawal means, at least four fluid reactant handling means within said chamber, all spaced apart along the length of said reaction chamber, a first external reactant inlet manifolding means in vapor flow communication with all but the two lowermost fluid reactant handling means, valve means associated with said first inlet manifolding means to permit exclusion of vapor flow between said manifolding means and any of the fluid handling means in vapor flow communication therewith, a first external reactant fluid outlet manifolding means in vapor flow communication with all but the two lowermost fluid reactant handling means, valve means associated with said first outlet manifolding means to permit exclusion of vapor flow between said outlet manifolding means and any of the fluid handling means in vapor flow communication therewith, a second external fluid reactant inlet manifolding means in vapor flow communication with all but the two uppermost reactant fluid handling means, valve means associated with said second fluid inlet manifolding means to permit exclusion of vapor flow between said second inlet manifolding means and any reactant handling means in vapor flow communication therewith, a second external fluid reactant outlet manifolding means in vapor flow communication with all but the two uppermost reactant fluid handling means, valve means associated with said second fluid outlet manifolding means to permit exclusion of vapor flow between said second fluid outlet manifolding means and any reactant handling means in vapor flow communication therewith, gas inlet pipes connecting into said chamber near its upper and lower ends, automatic flow control valves on said pipes and a differential pressure control instrument associated with said valves to operate the same responsive to change in differential pressure between the ends of said chambers and that under any of said reactant handling means.

4. An apparatus for conducting two or more conversions of hydrocarbons in the presence of the same moving stream of particle form solid contact mass material comprising in combination, an elongated reaction chamber of substantially constant cross section, means to supply contact mass material to the upper end thereof and means to withdraw it from the lower end thereof, flow throttling means associated with said withdrawal means, at least four fluid reactant handling means within said chamber, all spaced apart along the length of said reaction chamber, a first external reactant inlet manifold, pipes connecting said manifold directly in flow communication with all but the two lowermost fluid reactant handling means, valve means associated with said first inlet manifold to permit exclusion of vapor flow between said manifold and any of the fluid handling means in flow communication therewith, a first external reactant fluid outlet manifold, pipes connecting said manifold directly in flow communication with all but the two lowermost fluid reactant handling means, valve means associated with said outlet manifold to permit exclusion of vapor flow between said outlet manifold and any of the fluid handling means in flow communication therewith, a second external fluid reactant inlet manifold, pipes connecting said manifold directly in flow communication with all but the two uppermost fluid reactant handling means, valve means associated with said second fluid inlet manifold to permit exclusion of vapor flow between said second inlet manifold and any reactant handling means in flow communication therewith, a second external fluid reactant outlet manifold, pipes connecting said manifold directly in flow communication with all but the two uppermost reactant fluid handling means, valve means associated with said second fluid outlet manifold to permit exclusion of vapor flow between said second outlet and any reactant handling means in flow communication therewith, gas inlet pipes connected into said chamber near each end thereof, pressure operated flow control valves on said pipes, a differential pressure controller operatively connected to said valve to operate the same responsive to changes in pressure differential between the end sections of said chamber and the portions occupied by said fluid handling means, an inlet conduit connected into said chamber at at least one intermediate level along its length lying below the uppermost two fluid reactant handling means and below the lowermost two fluid reactant handling means, a pressure operated flow control valve on said conduit, a differential pressure controller operatively connected to said valve to operate the same responsive to changes in pressure differential in said chamber between the level of said last named conduit and the portions of said chamber thereabove and therebelow occupied by said fluid reactant handling means.

5. An apparatus for conducting two or more conversions of hydrocarbons in the presence of the same moving stream of particle form solid contact mass material comprising in combination an elongated reaction chamber of substantially constant horizontal cross sectional area along its length, means to supply contact mass material to the upper end thereof and means to withdraw it from the lower end thereof, flow throttling means associated with said withdrawal means, at least four fluid reactant handling means within said chamber, all spaced apart along the length of said reaction chamber, a first external reactant inlet manifold, pipes connecting said manifold directly in flow communication with all but the two lowermost fluid reactant handling means, valve means associated with said first inlet manifold to permit exclusion of vapor flow between said manifold and any of the fluid handling means in flow communication therewith a first external reactant fluid outlet manifold, pipes connecting said manifold directly in flow communication with all but the two lowermost fluid reactant handling means, valve means associated with said outlet manifold to permit exclusion of vapor flow between said outlet manifold and any of the fluid handling means in flow communication therewith, a second external fluid reactant inlet manifold, pipes connecting said manifold directly in flow communication with all but the two uppermost fluid reactant handling means, valve means associated with said second fluid inlet manifold to permit exclusion of vapor flow between said second inlet manifold and any reactant handling means in flow communication therewith, a second external fluid reactant outlet manifold, pipes connecting said manifold directly in flow communication with all but the two uppermost reactant fluid handling means, valve means associated with said second fluid outlet manifold to permit exclusion of vapor flow between said second outlet and any reactant handling means in flow communication therewith, pressure control devices associated with said first and second fluid outlet manifolds adapted to maintain the reactant pressure substantially the same in any two selected fluid reactant handling means positioned above the lowermost handling means and below the uppermost handling means.

6. An apparatus for conducting two or more conversions of hydrocarbons in the presence of the same moving stream of particle form solid contact mass material comprising: an elongated reaction chamber of substantially constant cross section, means to supply contact mass material to the upper end thereof and means to withdraw it from the lower end thereof, flow throttling means associated with said withdrawal means, at least four fluid reactant handling means within said chamber, all spaced apart along the length of said reaction chamber, a first external reactant inlet header and separate conduit means communicating said header directly with all but the two lowermost fluid reactant handling means, valve means associated with said conduit means to permit exclusion of vapor flow between said header and any of the fluid handling means in vapor flow communication therewith, a first external reactant fluid outlet header and separate conduit means communicating said header directly with all but the two lowermost fluid reactant handling means, valve means associated with said last named conduit means to permit exclusion of vapor flow between said outlet header and any of the fluid handling means in vapor flow communication therewith, a second external fluid reactant inlet header and separate conduit means communicating said header directly with all but the two uppermost reactant fluid handling means, valve means associated with said last named conduit means to permit exclusion of vapor flow between said second inlet header and any reactant handling means in vapor flow communication therewith, a second external fluid reactant outlet header, and separate conduit means communicating said header directly with all but the two uppermost reactant fluid handling means, valve means associated with said last named conduit means to permit exclusion of vapor flow between said second fluid outlet header and any reactant handling means in vapor flow communication therewith, flow regulating valves on at least all of said separate conduit means which communicate said first and second outlet headers with the fluid reactant handling means intermediate the uppermost and lowermost handling means, a differential pressure control device associated with said flow regulating valves adapted to actuate said flow regulating valves so as to maintain equal pressures in any given two of said intermediate fluid reactant handling means, gas inlet pipes connected into said chamber near each end thereof, instrument operated flow control valves on said pipes, a differential pressure controller operatively connected to said valves to operate the same responsive to changes in pressure differential between the end sections of said chamber and the portions occupied by said fluid handling means.

7. An apparatus according to claim 4 with the additional improvement of pressure control devices associated with said first and second fluid outlet manifolds adapted to maintain the reactant pressure substantially the same in any two selected fluid reactant handling means positioned above the lowermost handling means and below the uppermost handling means.

EDWARD L. SINCLAIR.
WILLIAM A. HAGERBAUMER.

REFERENCES CITED

The following references are of record in the file of this patent:

UNITED STATES PATENTS

| Number | Name | Date |
| --- | --- | --- |
| 2,351,214 | Kaufmann et al. | June 13, 1944 |
| 2,410,309 | Simpson et al. | Oct. 29, 1946 |
| 2,444,128 | Anderson | June 29, 1948 |
| 2,457,837 | Simpson et al. | Jan. 4, 1949 |
| 2,458,487 | Crowley, Jr. | Jan. 4, 1949 |

FOREIGN PATENTS

| Number | Country | Date |
| --- | --- | --- |
| 492,753 | Germany | Feb. 27, 1930 |
| 722,294 | France | Dec. 29, 1921 |